United States Patent [19]

Pesch et al.

[11] 4,424,895

[45] Jan. 10, 1984

[54] APPARATUS FOR THE MANIPULATION OF PRESS MATS

[75] Inventors: Jürgen Pesch, Krefeld-Traar; Günter Knoll, Krefeld-Fischeln; Werner Thelen, Kempen, all of Fed. Rep. of Germany

[73] Assignee: G. Siempelkamp GmbH & Co., Krefeld, Fed. Rep. of Germany

[21] Appl. No.: 238,708

[22] Filed: Feb. 27, 1981

[30] Foreign Application Priority Data

Feb. 29, 1980 [DE] Fed. Rep. of Germany ....... 3007731

[51] Int. Cl.³ ............................................ B65G 37/00

[52] U.S. Cl. .................................... 198/472; 198/484

[58] Field of Search ............... 198/472, 473, 477, 681, 198/484, 480, 648, 679, 690

[56] References Cited

U.S. PATENT DOCUMENTS

| | | | |
|---|---|---|---|
| 1,603,930 | 10/1926 | Young | 198/473 |
| 1,807,338 | 5/1931 | Greer | 198/472 |
| 2,649,183 | 8/1953 | Steck | 198/484 |
| 2,775,335 | 12/1956 | Simpson | 198 X/690 |
| 3,070,838 | 1/1963 | Hostettler | 198 X/472 |
| 3,086,663 | 4/1963 | Reindl | 198 X/472 |
| 3,578,144 | 5/1971 | Punzak | 198 X/648 |
| 3,987,751 | 10/1976 | Delonnay | 198 X/472 |

*Primary Examiner*—Joseph E. Valenza
*Assistant Examiner*—Dennis J. Williamson
*Attorney, Agent, or Firm*—Karl F. Ross; Herbert Dubno

[57] ABSTRACT

An apparatus for feeding mats to a press, e.g. for the production of particleboard or the like, comprises a feed conveyor with a discharge nose which lies in a plane tangent to the plane of a receiving conveyor entraining the mat into the press. Between the pick-up side of the receiving conveyor and the discharge end of the feed conveyor, this plane is tangent to a drum whereby press underlays are positioned beneath each mat with a head bar disposed ahead of the leading edge of the mat. According to the invention, the surface of the conveyor is provided with recesses to receive each bar so that the latter lies at least in part inwardly of the circumference or periphery of the drum while an underlay sheet lies along a drum surface which progressively merges with the circumference from this recess, i.e. is progressively asymptotic. When the recess is fixed, it can have a flank ahead of the bar against which the bar is positioned. When the surface is swingable to lift the bar out of the recess, the bar may be magnetically held on the movable portion defining the surface.

9 Claims, 6 Drawing Figures

APPARATUS FOR THE MANIPULATION OF PRESS MATS

FIELD OF THE INVENTION

Our present invention relates to a mat-handling apparatus and, more particularly, to a prepressing stage in the production of pressed board and particleboard or the like in which a sheet-like underlay having a head bar or like member at its leading end, is positioned beneath a mat of particulate or fiber material before the mat, on this underlay, is fed to a platen press or the like.

BACKGROUND OF THE INVENTION

In the production of pressed board and particleboard from fibrous materials to which thermally activated or thermosetting binders have been added or which utilize intrinsic binder substances, the mass of fiber and/or particles is generally formed into the shape of a rectangular mat and subjected to compaction in a platen press which may be a single-level or multilevel press.

The mats can be handled by conveyors in which the mat is formed on and deposited on the surface of the conveyor directly. To facilitate introduction of the mat into the press, it may be placed upon a flexible metal sheet or underlay which can be associated with a bar at the leading edge or head of the underlay so that the transfer of the sheet with the mat thereon onto further conveyors or onto the bed plate or a platen of the press, is facilitated.

The bar can be used as a spacer between the pressing surfaces to determine the degree of compaction and hence the thickness of the pressed body.

Particleboard of the aforedescribed type can be composed of wood and/or other cellulosic fibers or wood particles in the form of sawdust or chips and binders such as phenolic resins may be mixed with the particles before or after they are formed into the mats.

The pressing is generally effected under heat and with pressure calibrated to allow the finished board to have the desired thickness and density. Low-density board may be used for insulation, decorative and partitioning purposes, while more dense board may be used for a variety of structural or load-bearing purposes.

Particleboard made in the aforedescribed manner may be laminated to decorative or protective layers which can be applied to the mat in the form of foils before the mat is introduced into the press and various textures may be imparted to the board surface to imitate natural wood patterns or the like.

The press sheets can be composed of stainless steel or other materials to which the mat does not readily stick and to which the board, upon hot-pressing, does not adhere.

Upon completion of the pressing operation, the press sheets and the associated head bars are generally recycled to the station at which they were originally applied to the underside of the mat.

In the handling of mats in the aforedescribed manner, it has been proposed heretofore to deliver the mat to the latter station on a feed conveyor whose discharge edge was formed as a nose overhanging a drum which delivered the press sheet or underlay and the head bar attached at the leading edge to the sheet, to the region between the discharge edge of the feed conveyor and the pick-up end of a receiving or transfer conveyor which carried the mat to the press.

Thus an apparatus of this type (see German patent No.22 36 937) comprised a feed conveyor belt upon which the rectangular mat was formed or onto which this mat had previously been deposited directly, an intermediate storage drum for delivering the press sheet and its head bar, and a receiving conveyor upon which the sheet having the mat deposited thereon, was carried away.

The feed conveyor had its transfer end or nose extending toward and overhanging the point at which the drum carried the head bar and attached press sheet to the horizontal receiving plane of the receiving conveyor.

The drum was so constructed and arranged that each bar lay above the drum surface while the associated sheet lay upon the cylindrical drum surface, the drum having a receptacle likewise disposed above the drum surface for entraining the bar and, therewith, the sheet in the direction of drum rotation.

For ease in entrainment of the underlay, i.e. the combination of the head bar and the sheet or web, the head bar must be relatively thick and rigid and thus projects well above the flexible layer on the drum surface. The receiving conveyor is formed with entraining members which engage this bar.

Since the bars lie above the periphery of the drum and the bar-engaging entrainers of the drum also project above the periphery, the displacement planes of the feed conveyor and the receiving conveyor must be disposed above a tangent plane to the drum surface at its apogee so as to clear the projections from the drum which entrain the bars.

Since the discharge end of the feed conveyor overhanging the drum also has a thickness which is not insignificant, its conveyor plane must be spaced further above the tangent plane by a corresponding amount.

As a result, when the mat is deposited on the underlayment, the transfer is effected over a downward step which can be damaging to the mat and can generate folds, wrinkles or dislocations therein which appear at least in part in the finished product. Since this effect is most pronounced at high transfer speeds, the operating speed of the apparatus must be limited.

OBJECTS OF THE INVENTION

It is the principal object of the present invention to provide an apparatus for the purposes described which permits an improved transition between the feed conveyor, press underlay and receiving conveyor whereby a drop or step during transfer does not occur and the transition is smoother.

Another object of the invention is to provide a mat-handling apparatus whereby the disadvantages of the earlier system described are obviated.

Yet another object of this invention is to provide an improved apparatus for the transfer of mats and flexible press underlays with head bars to a receiving conveyor which can effect a mat-distortion free transfer at higher speeds than has hitherto been the case.

SUMMARY OF THE INVENTION

These objects and others which will become apparent hereinafter are attained, in accordance with the present invention, in a mat-transfer apparatus for the purposes described which comprises a feed conveyor having a discharge or transfer end or nose with a mat-displacing surface lying in a plane, a receiving conveyor defining a transport surface which also lies in this plane and is spaced from the discharge end of the feed conveyor, and an intermediate storage drum entraining press underlays each having a respective head bar, to the region between these conveyors. According to the invention, the drum is formed with a recessed portion adapted to receive the bar, this recessed portion lying inwardly of the periphery of the drum which is tangent to the plane at a location between the discharge end of the feed conveyor and take-up end of the receiving conveyor.

From this recess to the cylindrical drum portion trailing the recess with respect to the direction of rotation of the drum, a transition surface is provided along which the flexible underlay sheet lies, this transition surface progressively approaching the cylindrical portion of the drum periphery, i.e. being asymptotic thereto. The word "asymptotic" is here used not in its strict mathematical sense to imply approach but no contact, but rather in the sense of approach at a progressively decreasing approach angle so that an especially smooth transition is provided between the surface and cylindrical portion of the drum periphery into which it merges.

According to a feature of the invention, the recessed portion is provided at a relatively leading part thereof in the direction of rotation of the drum, which an abutment step, shoulder or flank against which the leading end of the bar can come to rest, the recessed portion being shaped to accommodate the bar inwardly of an imaginary cylindrical surface of a radius equal to the distance between the center or axis of the drum and the plane at which the transfer occurs. Thus the leading edge of the mat will meet the press underlay rearwardly of the head bar in this plane, the underlay and the head bar with the mat progressively deposited on the flexible sheet will be transferred to the receiving conveyor in this plane, and the movement of the mat from the feed conveyor to the receiving conveyor and its deposit upon the underlay will all be free from steps or dislocations.

This permits transfer at especially high speeds.

According to a feature of the invention, the entrainment of the bar on the drum is effected by another flank of the recessed portion which is upstanding from the bar upon which the bar rests and is spaced from the abutment flank by approximately the width of the bar to engage behind the latter. The asymptotic transition surface at this entrainment flank end extends over only a fraction of the length of the flexible sheet.

Depending upon the diameter of the drum and the length of the press underlays, one or more such recessed portions and transition surfaces can be provided along the periphery of the drum.

According to another embodiment of the invention, the recessed portion can be provided with electromagnetic means for retaining the bar in the recessed portion until the underlay is to be transferred to the receiving conveyor. Of course, this magnetic means may be deactivated by appropriate timing switches to release the bar for engagement by the receiving conveyor.

According to yet another feature of the invention, the transition surface itself is movable on the drum, i.e. is formed on a swingable member which can pivot this surface so that it lies along the imaginary cylindrical surface mentioned previously. The means for pivoting the latter member can be a fluid-operated cylinder which is pressurized by a solenoid valve controlled by switches which can be synchronized with those operating the retaining electromagnet.

As will be apparent, this latter embodiment has the advantage that when the drum is provided with a plurality of recessed portions and respective transition surfaces adapted to receive a number of underlays, a given drum can be used for underlays of greater length by swinging the transition surface into its outer position, thereby eliminating the respective recessed portion and extending the cylindrical surface of the drum.

For example, if for one press format four recessed portions are provided to accommodate a corresponding number of press underlays which are relatively short, alternate recessed portions can be eliminated by swinging the transition surfaces outwardly leaving the drum with two recessed portions adapted to accommodate the longer press underlays which can extend substantially over half the circumference of the drum each.

BRIEF DESCRIPTION OF THE DRAWING

The above and other objects, features and advantages of the present invention will become more readily apparent from the following description, reference being made to the accompanying drawing in which.

SPECIFIC DESCRIPTION

Figure 1:
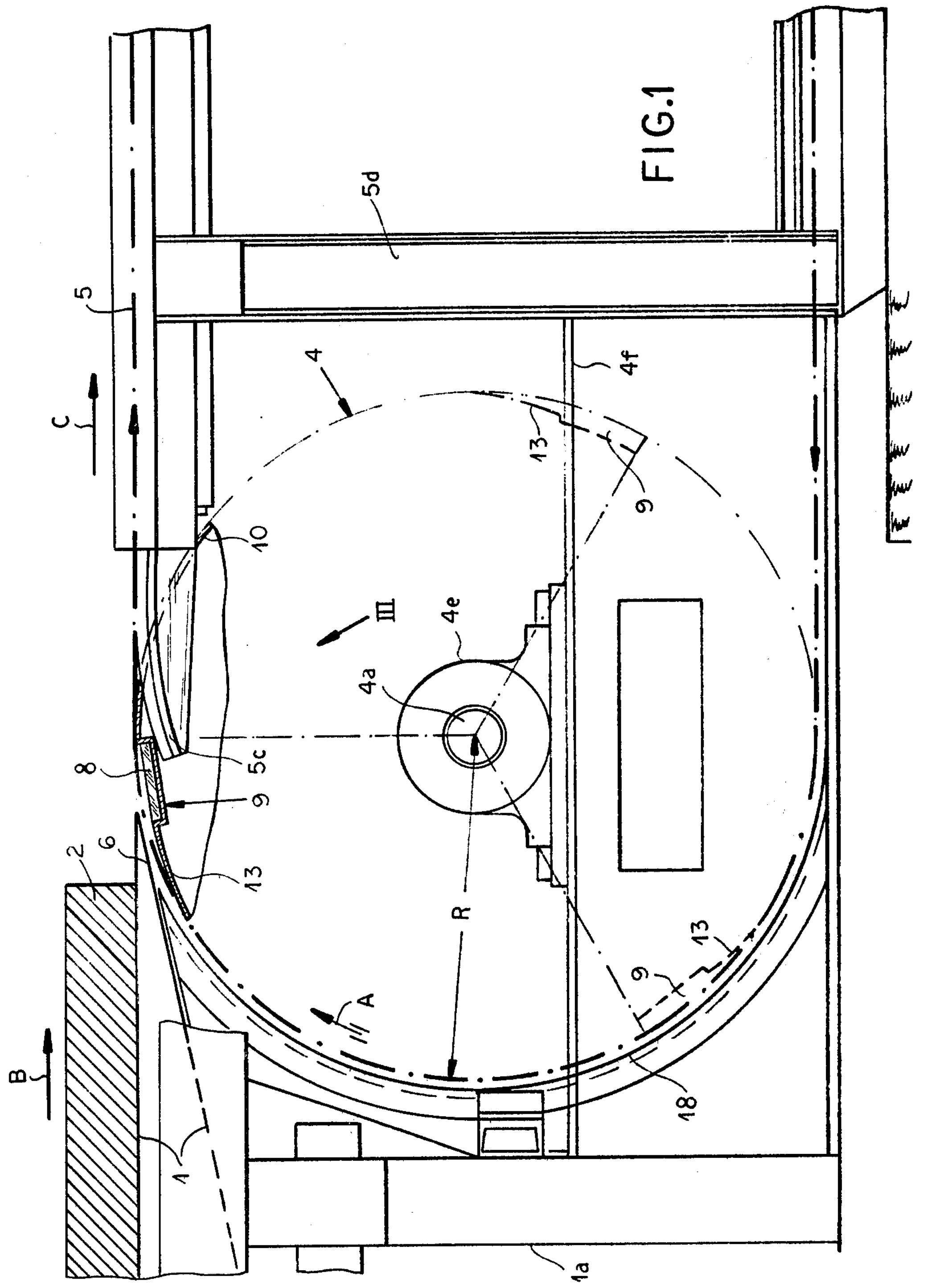
FIG. 1 is a side-elevational view, partly broken away and in highly diagrammatic form, illustrating the principles of the present invention.
Figure 2:
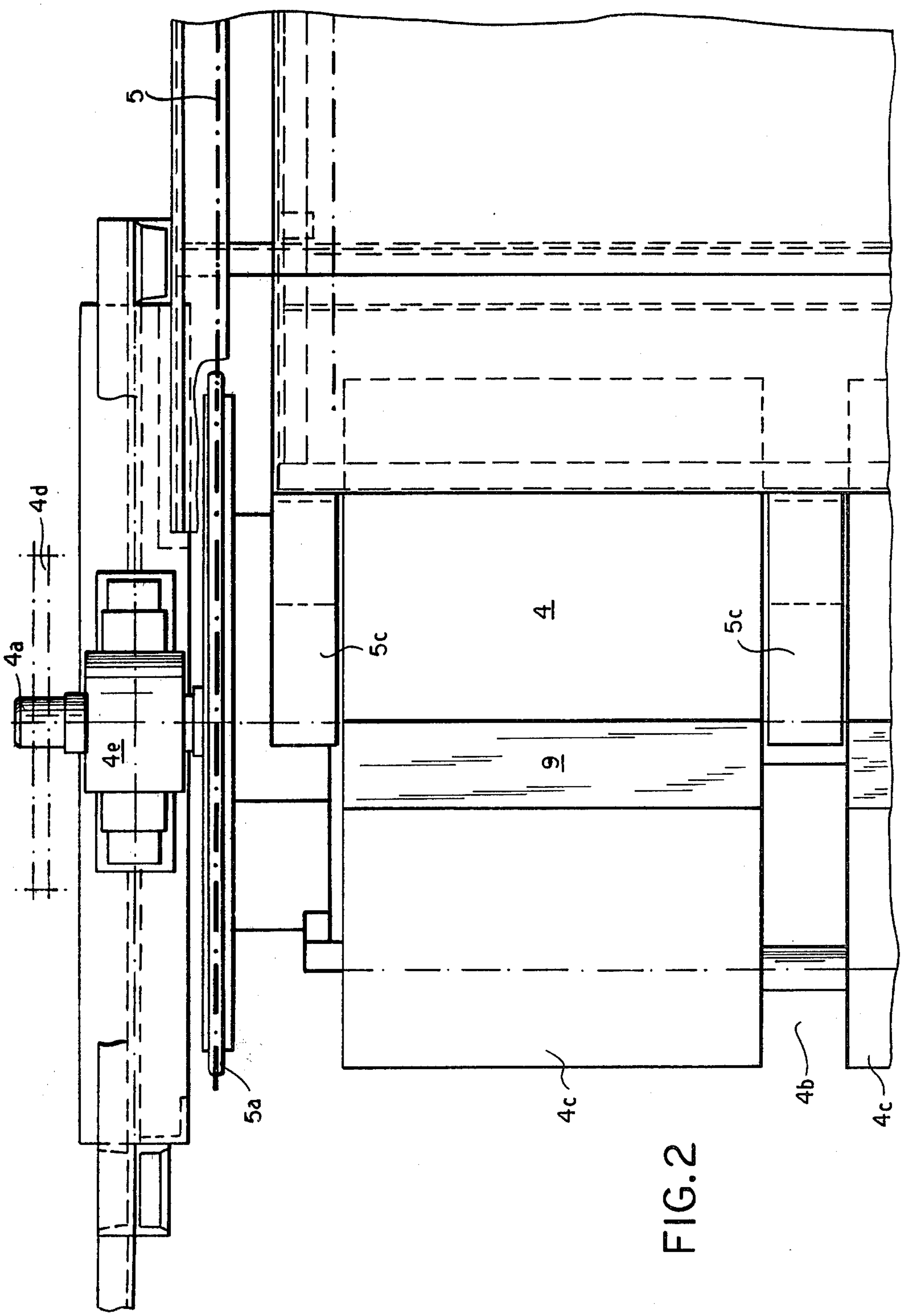
FIG. 2 is a plan view of a portion of the apparatus of FIG. 1 with the feed conveyor removed.
Figure 3:
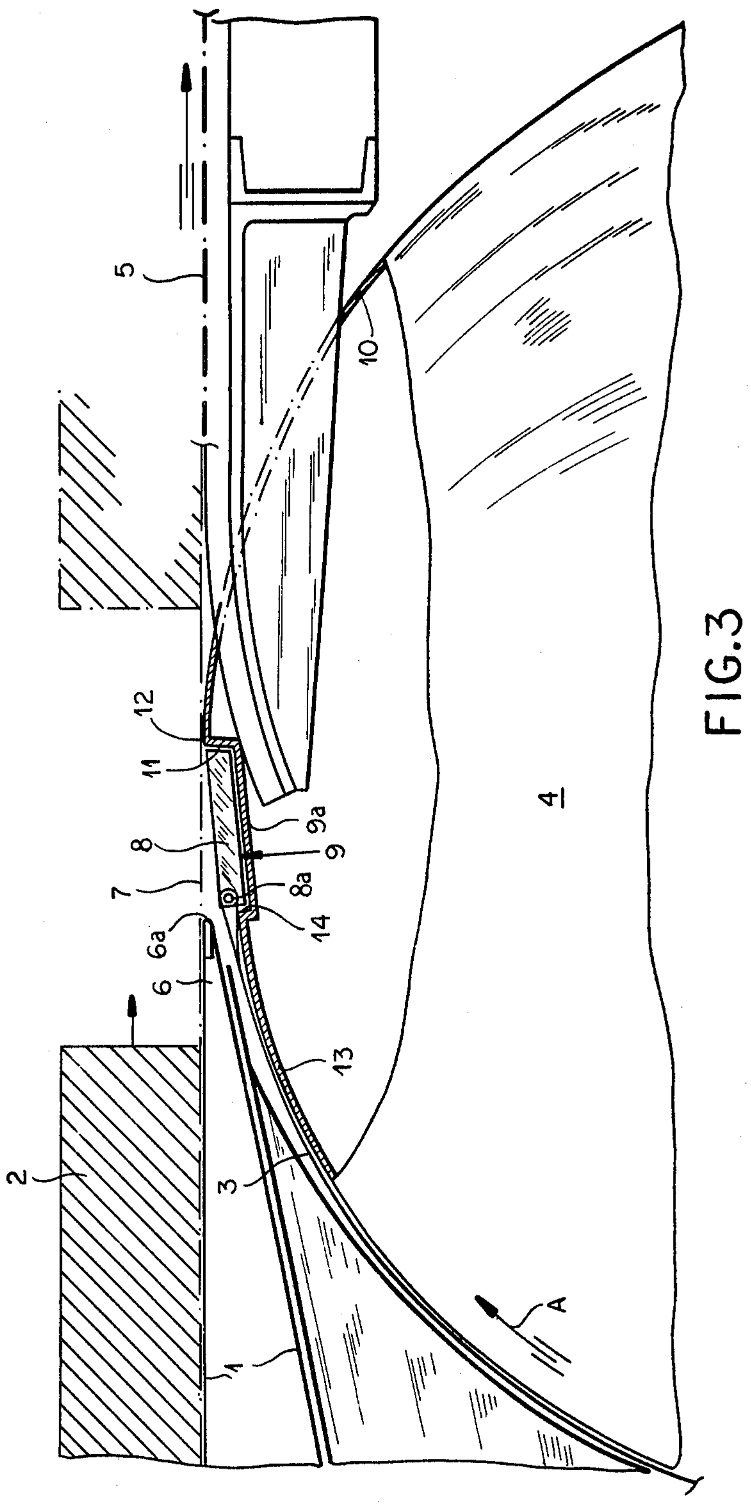
FIG. 3 is a detail view of the portion III of FIG. 1.

In the embodiment of FIGS. 1 through 3 of the drawing, the transfer apparatus can be seen to comprise a feed conveyor generally represented at 1 and comprising a thin flexible band which turns around a tip **6*a* of a discharge end or nose 6. The upper surface of the feed conveyor 1 defines a plane 7 along which the mat 2** of the material to be formed into the particleboard is conveyed.

According to the invention, the particleboard mat is deposited upon a press underlay 3 which is formed at its leading end with a head bar 8, the flexible member 3 being looped around a rod **8*a* to connect it to the bar 8. Member 3 may be a screen or the like and is disposed beneath the mat 2 when it is entrained by a receiving conveyor diagrammatically represented at 5**, into a press not shown. The press may be a conventional platen press.

From FIG. 1 it will be apparent that the discharge end 6 of the feed conveyor 2 not only lies in the horizontal plane 7 (FIG. 3), shown in dot-dash lines, but terminates short of the receiving conveyor 5 so that a gap is provided between the conveyors in which the apogee of the periphery of the drum 4 is tangent to this plane.

Figure 5:
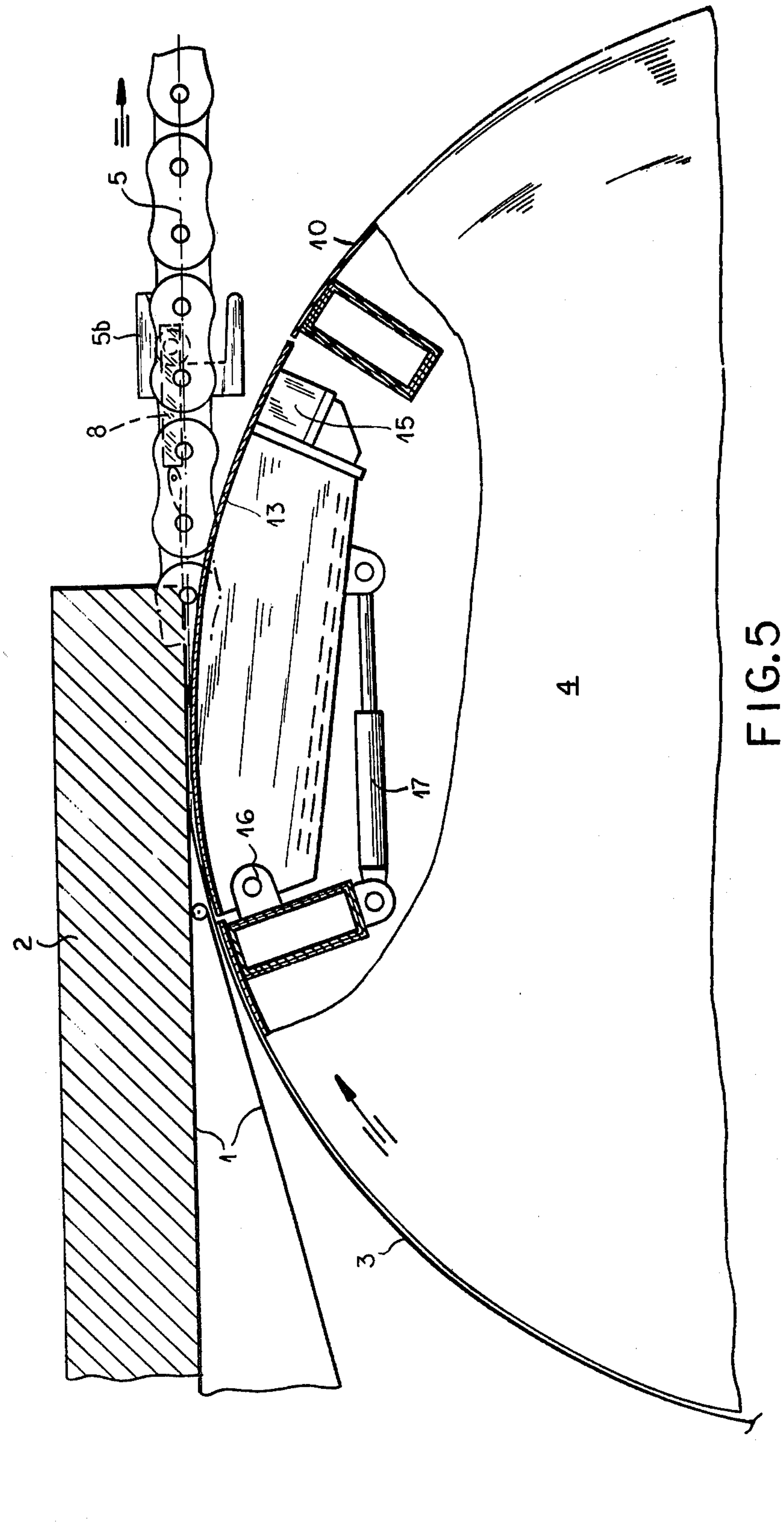
FIG. 5 is a diagram of the embodiment of FIG. 4 in another position.

The conveyor 5 is formed by chains passing over sprockets **5*a* fixed to the drum shaft 4*a* at opposite axial ends of the latter and carrying channel-shaped entrainers one of which may be discerned at 5*b* in FIG. 5, to engage projecting portions of the bar 9 and enable the bar to ride along the fixed rails 5*c* which are mounted upon the support framework 5*d* of the receiving conveyor and reach into gaps 4*b*** between axially spaced sections 4c of the drum 4. A sprocket wheel 4d at one end of the shaft 4a can be engaged by a chain connected to the drive sprocket of a motor (not shown) to rotate the drum in the clockwise sense represented by the arrow A which corresponds to the feed direction B of conveyor 1 and the entrainment direction arrow C of conveyor 5.

The shaft 4a is journaled in bearing blocks 4e at opposite axial ends of the shaft, these bearing blocks being mounted upon a framework 4f, connected to the framework 5d of the receiving conveyor 5 and the support structure 1a of the feed conveyor 1.

Since the bars 8 extend substantially over the entire length of the drum and project therebeyond, as the drum rotates, the rails 5c lift the bars 8 into the plane 7 along which the bars are entrained by members 5b of the conveyor 5 with the mat 2 resting upon the flexible sheet 3.

The receiving conveyor 5 thus also overhangs the drum 4 which is shown in dot-dash lines in FIG. 1.

Each of the bars 8 is received in a receptacle or pocket formed as a recessed portion 9 on the drum sections 4c below the cylindrical drum surface 10 which, as will be apparent from FIG. 1, is a cylindrical surface of radius R equal to the distance between the center of the shaft 4a and the plane 7.

In the embodiment of FIGS. 1 through 3, three angularly equispaced pockets 9 are formed along the periphery of the drum and at the leading side of each pocket in the direction of the drum rotation there is provided an abutment flank 11 which has a height substantially equal to the thickness of the bar 8 received in the pocket 9.

Spaced rearwardly with respect to the direction of rotation of the drum, each pocket is formed with a shorter flank 14 which engages the trailing edge of the bar 8 to entrain it in the direction of arrow A.

Each pocket 9 also has a base 9a upon which the bar 8 is seated and at the flank 14 lies at the leading edge of a transition surface 13 which, as it extends rearwardly with respect to the sense of rotation, progressively merges with the cylindrical drum surface 10, i.e. is asymptotic thereto in the sense mentioned previously. The flank 11 extends inwardly from the outer edge 12 to a greater depth than the leading edge of the transition surface 14.

The bars 8 trailed by the respective sheets 3 can be fed to the pockets 9 in any conventional manner and are held against the drum by semicircular guide elements 18.

The drum is of course coupled with the conveyors so that the leading edge of each mat 2 is deposited upon the sheet 3 of a bar 8 as it is lifted out of the respective pocket 9 and engaged by the receiving conveyor 5. From FIG. 3 it will be apparent that this transfer is effected without any dislocation of the mat.

Figure 4:
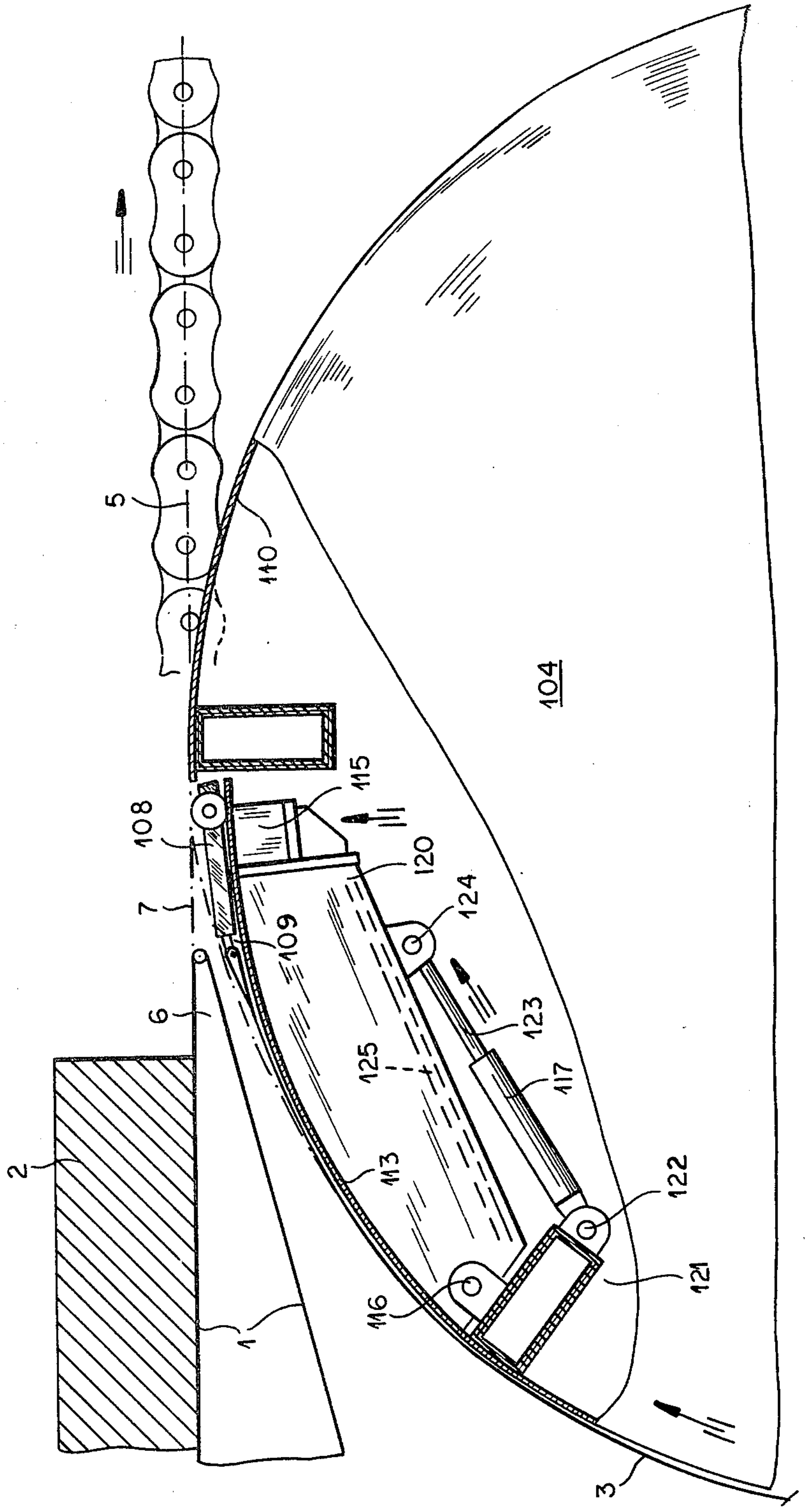
FIG. 4 is a view corresponding to FIG. 3 illustrating another embodiment of the invention.
Figure 6:
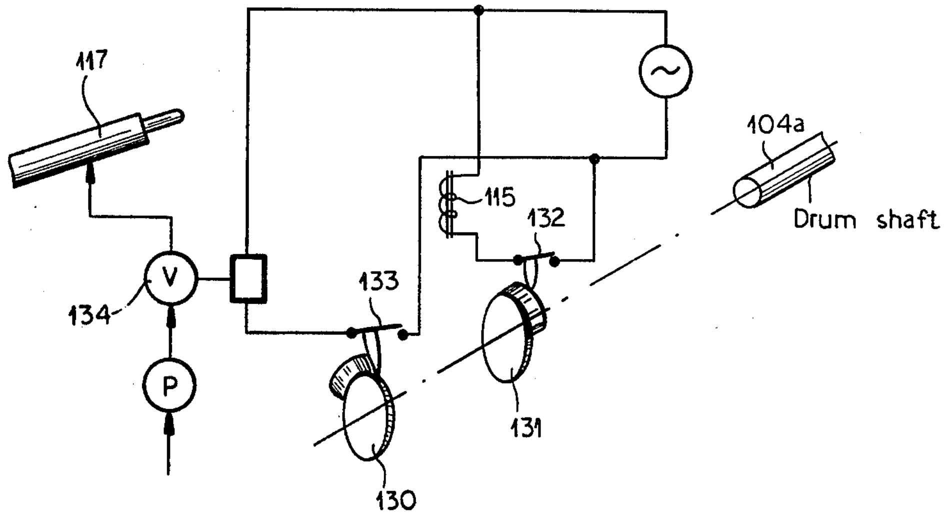
FIG. 6 is a diagram assisting in the explanation of the embodiment of FIGS. 4 and 5.

FIGS. 4 through 6 illustrate a modification of this system. In these FIGURES, the pocket or recessed portion 109 of the drum 104 having the cylindrical periphery 110, is formed by providing the transition surfaces 113 upon a member 120 which is pivotally connected at 116 to a bar 121 fixed on the drum 104.

A fluid-operated cylinder 117 is pivotally connected at 122 to the bar 121 and has its rod 123 articulated at 124 to the member 120. Thus, extension of the rod 123 from the cylinder 117 from the position shown in FIG. 4 will swing the surface 113 outwardly to cause it to lie along the imaginary cylindrical surface mentioned previously. However, when this rod 123 is retracted into the cylinder, member 120 is swung inwardly to form a gap between the surface 113 and the imaginary cylindrical surface which constitutes the pocket or recessed portion receiving the bar 108.

At the leading end of the surface 113, an electromagnet 115 is mounted to serve as the entraining means for the bar.

For the embodiment of FIGS. 4 and 5, the drum 104 may have its shaft 104a connected with cams 130 and 131 (FIG. 6) which have been shown only diagrammatically and represent the part of the timing system necessary for this description only. The cam 131 controls the electromagnet 115 which is energized through a switch 132 operated by the cam 131. When the cam opens the switch the electromagnet is released to permit the magnetically attractable bar 108 to be entrained by the receiving conveyor 5.

Prior thereto, the cam 130 operates a switch 133 to open the electromagnetic valve 134 and energizes the cylinder 117 to swing the bar 108 above the plane 117 to which the cylindrical surface 110 is tangent. Otherwise the system operates in the manner described with respect to FIGS. 1 through 3.

To facilitate the pivoting movement of member 120, the pivot 124 is slidable in a rail shown diagrammatically at 125. The member 108 may be composed of a ferromagnetic material, e.g. iron or steel, or may have magnetically attractable parts secured thereto.

We claim:

1. An apparatus for transferring mats in the production of pressed board, comprising:
- a feed conveyor having a discharge end and a mat-carrying surface lying in a horizontal plane and adapted to feed a mat along said plane;
- a receiving conveyor spaced from said end of said feed conveyor for entraining a mat along said plane;
- an intermedite drum disposed between said conveyors, said drum having:
  - a cylindrical periphery tangent to said plane,
  - at least one recessed portion inwardly of said cylindrical periphery for receiving a head bar connected to a flexible underlay for said mat,
  - a transition surface extending from said recessed portion of said cylindrical periphery and progressively merging therewith along which said underlay lies,
  - means for retaining said bar in said recessed portion during rotation of said drum until said recessed portion reaches said plane, and
  - means for shifting said bar into said plane as said recessed portion approaches said plane, said recessed portion being a fixed pocket formed in said drum and having a leading flank in the direction of rotation of said drum forming an abutment for a leading edge of said bar, said transition surface having a leading edge disposed inwardly of the outer edge of said flank, said transition surface being formed on a movable member on said drum swingable between a position wherein said transition surface lies inwardly of said cylindrical periphery and a position in which said transition surface lies along said cylindrical periphery, means being provided in said drum to swing said movable member between said positions.

2. The apparatus defined in claim 1, further comprising a fluid-operated cylinder arrangement connected with said member for swingably displacing same.

3. An apparatus for transferring mats in the production of pressed board, comprising:

a feed conveyor having a discharge end and a mat-carrying surface lying in a horizontal plane and adapted to feed a mat along said plane;

a receiving conveyor spaced from said end of said feed conveyor for entraining a mat along said plane;

an intermediate drum disposed between said conveyors, said drum having:

a cylindrical periphery tangent to said plane, at least one recessed portion inwardly of said cylindrical periphery for receiving a head bar connected to a flexible underlay for said mat, a transition surface extending from said recessed portion of said cylindrical periphery and progressively merging therewith along which said underlay lies, means for retaining said bar in said recessed portion during rotation of said drum until said recessed portion reaches said plane, and means for shifting said bar into said plane as said recessed portion approaches said plane, said recessed portion being a fixed pocket formed in said drum and having a leading flank in the direction of rotation of said drum forming an abutment for a leading edge of said bar, said transition surface having a leading edge disposed inwardly of the outer edge of said flank, said pocket being formed with a trailing flank of smaller height than said leading flank and engaging said bar to entrain said bar with rotation of said drum, stationary rails engaging said bar upon rotation of said pocket to said plane to lift said bar out of said pocket, a semicular guide being disposed along said cylindrical periphery for retaining said underlay thereagainst.

4. An apparatus for transferring mats in the production of pressed board, comprising:

a feed conveyor having a discharge end and a mat-carrying surface lying in a horizontal plane and adapted to feed a mat along said plane;

a receiving conveyor spaced from said end of said feed conveyor for entraining a mat along said plane;

an intermediate drum disposed between said conveyors, said drum having:

a cylindrical periphery tangent to said plane, at least one recessed portion inwardly of said cylindrical periphery for receiving a head bar connected to a flexible underlay for said mat, a transition surface extending from said recessed portion to said cylindrical periphery and progressively merging therewith along which said underlay lies, means for retaining said bar in said recessed portion during rotation of said drum until said recessed portion reaches said plane, said transition surface being formed on a movable member on said drum swingable between a position wherein said transition surface lies inwardly of said cylindrical periphery and a position in which said transition surface lies along said cylindrical periphery, and a fluid-operated cylinder arrangement connected with said member for swingably displacing same; and means for shifting said bar into said plane as said recessed portion approaches said plane.

5. The apparatus defined in claim 4, further comprising a semicircular guide disposed along said cylindrical periphery for retaining said underlay thereagainst.

6. The apparatus defined in claim 4 wherein said recessed portion is a fixed pocket formed in said drum and having a leading flank in the direction of rotation of said drum forming an abutment for a leading edge of said bar, said transition surface having a leading edge disposed inwardly of the outer edge of said flank.

7. The apparatus defined in claim 6 wherein said pocket is formed with a trailing flank of smaller height than said leading flank and engaging said bar to entrain said bar with rotation of said drum.

8. The apparatus defined in claim 7, further comprising stationary rails engaging said bar upon rotation of said pocket to said plane to lift said bar out of said pocket.

9. The apparatus defined in claim 4 wherein said retaining means comprises an electromagnet disposed in said recessed portion and magnetically seizing said bar.

* * * * *